No. 898,392. PATENTED SEPT. 8, 1908.
W. N. SPRINGER.
CORN HUSKING MACHINE.
APPLICATION FILED JULY 31, 1896.
5 SHEETS—SHEET 2.
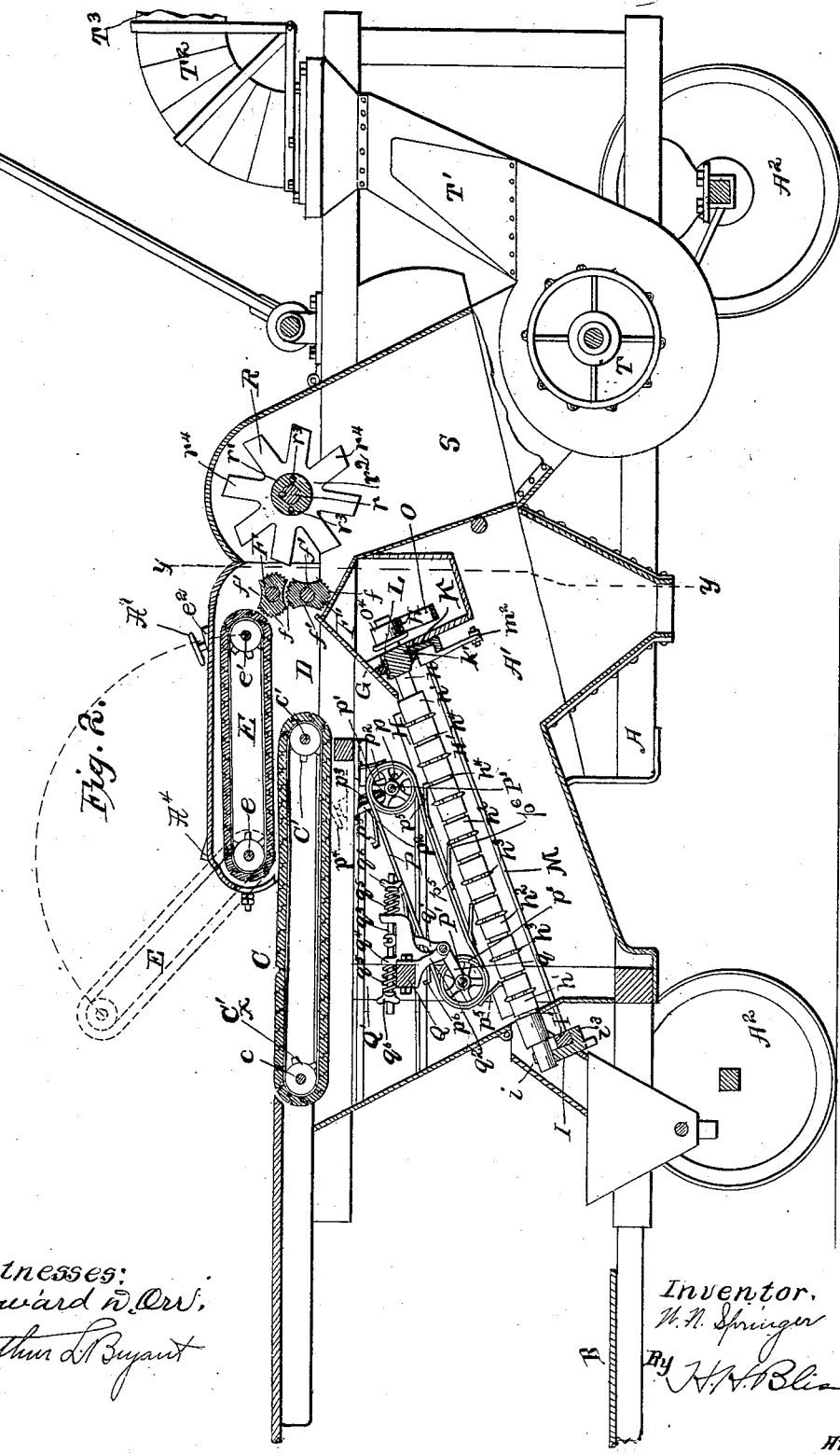
Witnesses:
Howard W. Orr
Arthur L. Bryant
Inventor.
W. N. Springer
By H. H. Bliss
Atty.

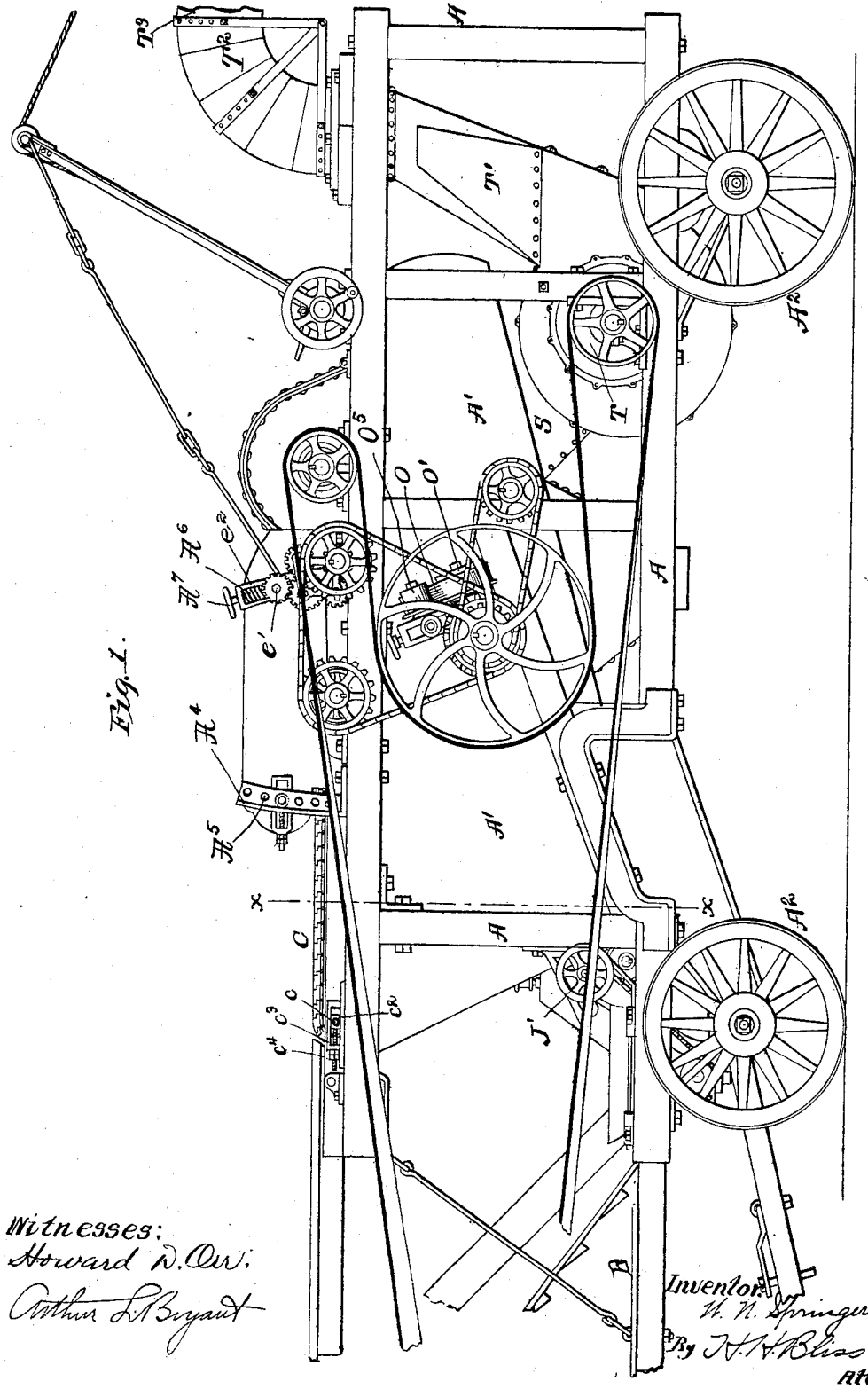

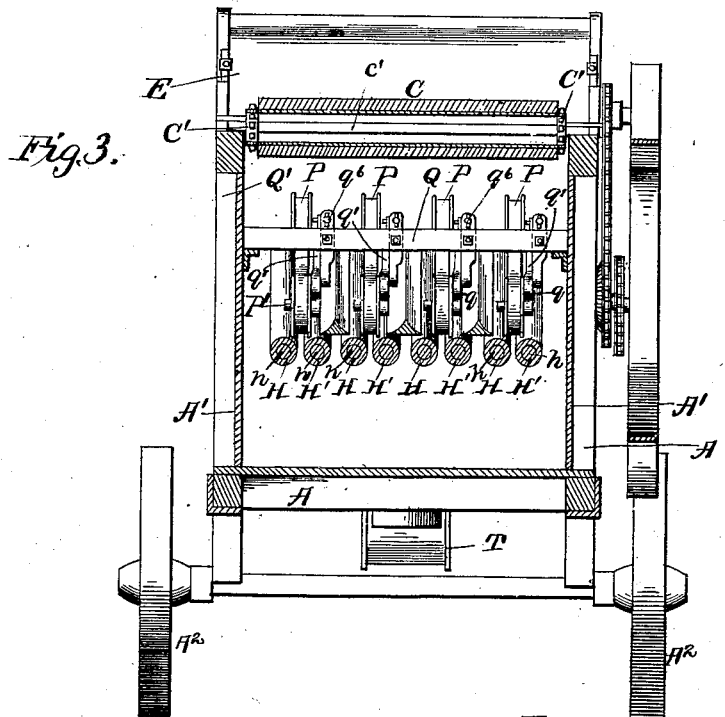
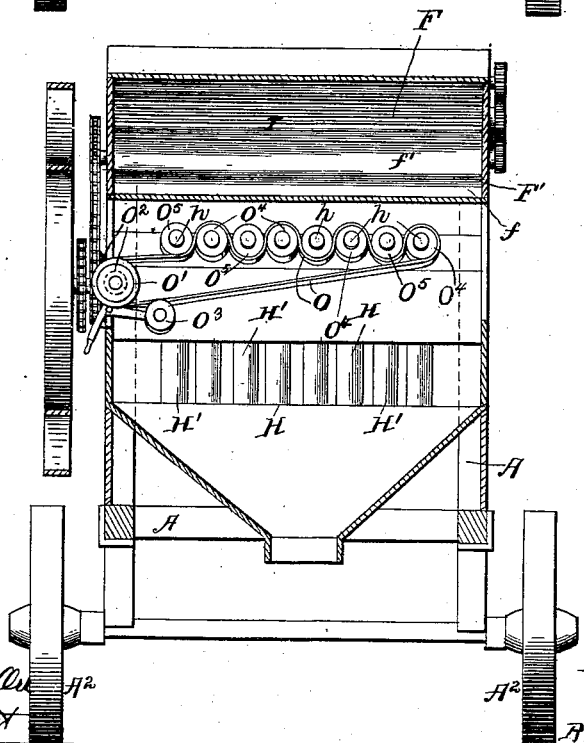

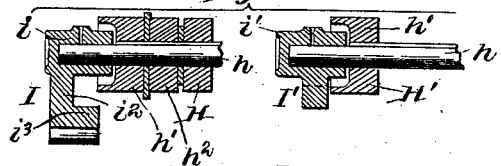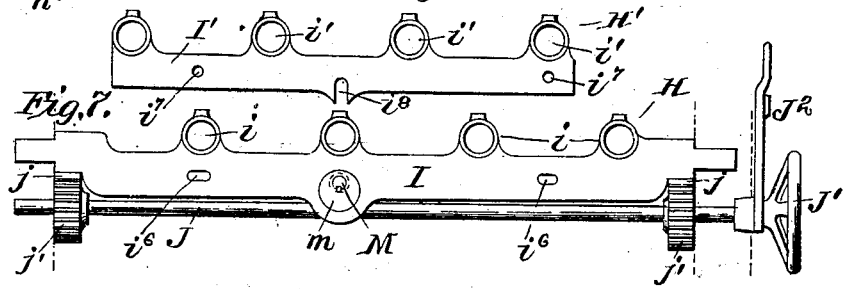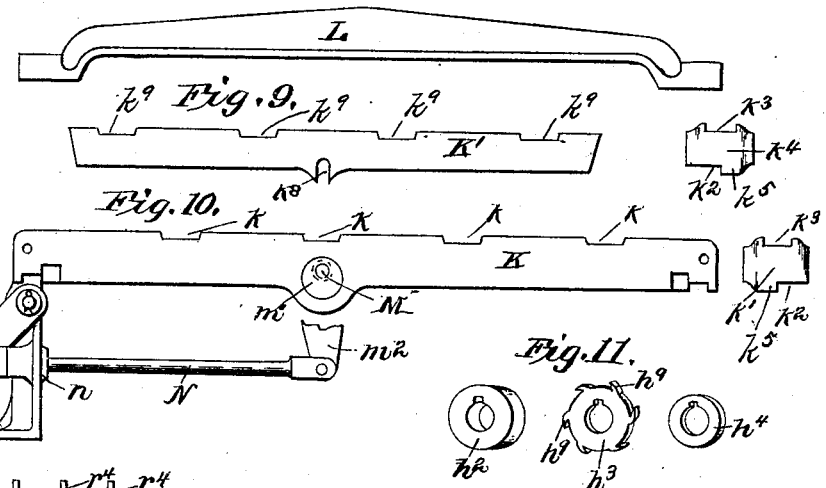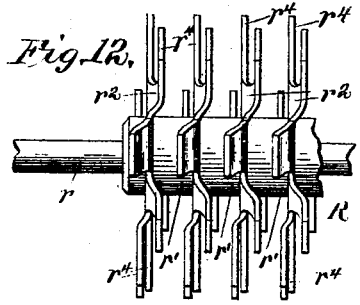

No. 898,392. PATENTED SEPT. 8, 1908.
W. N. SPRINGER.
CORN HUSKING MACHINE.
APPLICATION FILED JULY 31, 1896.
5 SHEETS—SHEET 5.
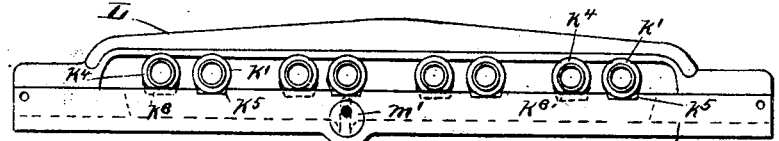
Fig. 16.
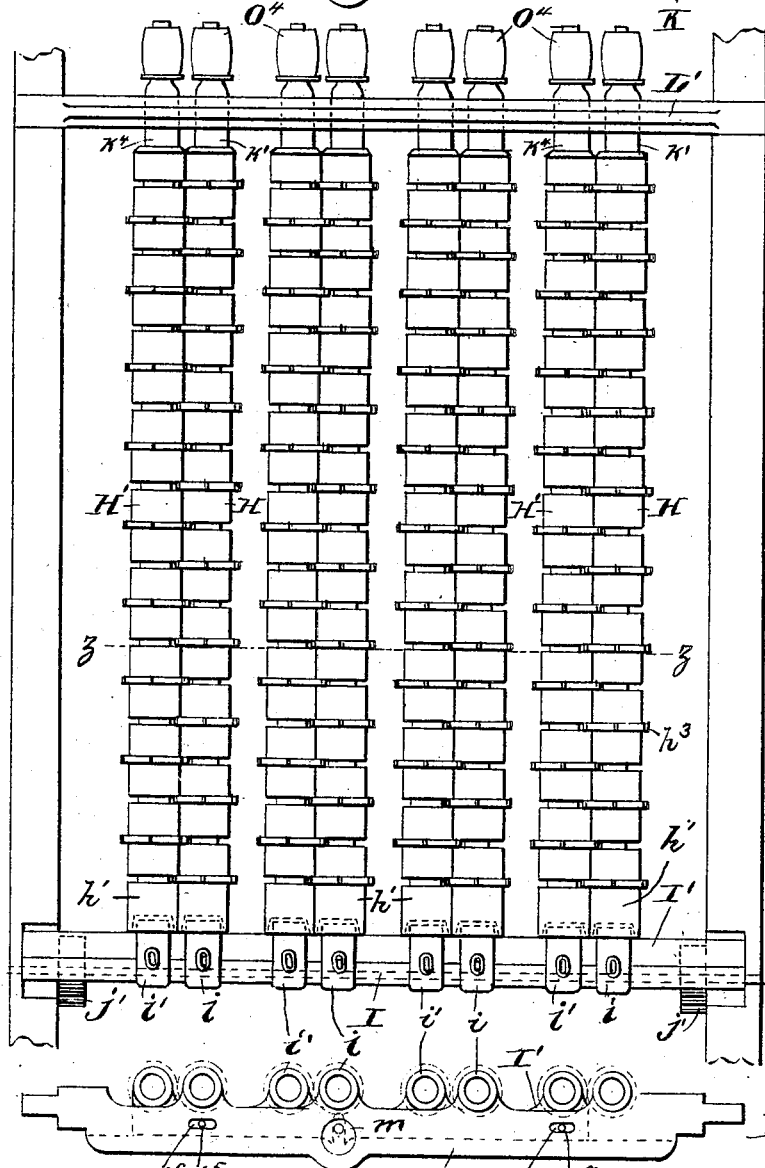
Fig. 15.
Fig. 17.
Fig. 18.
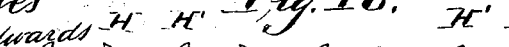
Witnesses
Wm H Edwards
Arthur L Bryant
Inventor
William N Springer
By H. H. Bliss
his Atty.

UNITED STATES PATENT OFFICE.

WILLIAM N. SPRINGER, OF PEORIA, ILLINOIS.

CORN-HUSKING MACHINE.

No. 898,392.  Specification of Letters Patent.  Patented Sept. 8, 1908.

Application filed July 31, 1896. Serial No. 601,245.

*To all whom it may concern:*

Be it known that I, WILLIAM N. SPRINGER, citizen of the United States, residing at Peoria, in the county of Peoria and State of Illinois, have invented certain new and useful Improvements in Corn-Husking Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a side elevation of a machine embodying my improvements. Fig. 2 is a longitudinal section of the same. Fig. 3 is a cross section on the line $x, x$ of Fig. 2. Fig. 4 is a cross section on the line $y, y$, Fig. 2. Figs. 5, 6 and 7 show details of the lower supports for the husking rolls. Figs. 8, 9 and 10 show details of the supporting devices for the upper ends of the husking rolls. Fig. 11, illustrates the different collars and washers forming part of each husking roll. Fig. 12 is a detail view of the shredder. Fig. 13 is a sectional view, illustrating the means for supporting the husking rolls. Fig. 14 is a detail of one end of one of the supports for the lower ends of the husking rolls. Fig. 15 is a plan view, on an enlarged scale, of the husking rolls and their supporting frame; Fig. 16 is an elevation of the upper ends of said rolls; Fig. 17 is a similar view of the lower ends; Fig. 18 is a sectional view on the line $z$—$z$ of Fig. 15.

In the drawings A represents a frame having suitable longitudinal and vertical and cross pieces and supporting the sides and top and bottom of a casing, A′, the whole being mounted on wheels $A^2, A^2$. At the front end of the machine there is a platform at B, to support the operator while feeding the machine.

On the upper part of the front end of the frame there is a feeder or carrier, C, mounted on the shafts $c$ and $c'$, having sprocket wheels, C′, C′. The outer shaft $c$ is adjustably mounted in sliding boxes $c^2$ held in guides $c^3$ and adapted to be moved by the screws $c^4$.

The stalks are carried inward by the conveyer C and projected across an open space at D to the snapping rolls. In order to elevate the ends of the stalks and insure that they shall not drop below the snapping rolls, I combine with the carrier C means for depressing it on a line near the inner shaft $c'$. For this purpose I prefer to use the mechanism which is combined with the carrier for advancing the stalks. Above the carrier there is a second endless apron or supplemental carrier E. It is mounted upon shafts $e, e'$ carrying sprocket wheels which drive its chains. The shafts $e, e'$ are both adjustable vertically the front shaft $e$ tending to drop low enough to press down the inner end of the main carrier C.

As indicated in Fig. 1 the forward shaft $e$ of the supplemental carrier is preferably supported by having its ends inserted in the apertures $A^5$ formed in uprights or standards, $A^4$ secured to the main frame. By this construction the forward end of the supplemental carrier can be adjusted vertically and held in any adjusted position, thereby regulating the extent to which the inner portion of the upper part of the main carrier belt C, is depressed. When desired the rear end of the upper apron E can be swung up and forward, the shaft $e$ turning in its bearing on the main frame as indicated by dotted lines to permit access to the interior. The inner end of apron E is held down by springs $A^6$ which permit it to yield when necessary. The shaft $e'$ projects into guides $e^2$ within which the springs $A^6$, are arranged, the tension of said springs being controlled by adjusting screws $A^7$. It will be seen, that when the outer end of the apron E bears downward upon the material on the apron C the latter causes the ends of the stalks to be projected upward relatively to the snapping rolls. The latter are indicated by F, F′. They are made in a peculiar way, to which I have been led by my experience with numerous machines of the earlier types. Generally use is made of small rollers which are circular in section, and sometimes with and sometimes without teeth. These rollers must be of small diameter in order to prevent the ears of corn being drawn between them, the latter always resulting if the rolls are of a diameter more than two or three inches.

I have devised a shape by which the propelling of the stalks can be effected advantageously and by which the snapping of the ears from the stalks can be accomplished even though the rolls run at a high speed. Each roll is made with two parts $f, f$ of a longer radius from the axis, and bounded by a curved periphery provided with a number of small corrugations, and with two recessed parts $f'$ $j'$, of a shorter radius from the axis and having concaved surfaces. The elongated parts $f$ of one roll are arranged to come opposite to the concave parts of the other during rotation. As the corrugated parts at $f$ come around they grip the stalks and force them along and at the same time prevent any ear from following the stalks as it is caught powerfully at its stem end and not only pinched on transverse lines but is pushed back somewhat because of the relative shapes of the convex part $f$ of one roll and the concave part $f'$ of the opposing roll.

The ears after being snapped from the stalks fall upon and are caught by the chute G and conducted to the husking rolls H, H'. The latter are arranged in pairs, those of each pair rotating in opposite directions. Each roll comprises a shaft $h$, an end collar $h'$, a series of thimbles or collars $h^2$, a series of toothed washers $h^3$, and a series of smooth washers $h^4$.

The shafts of the rolls H, H, are at their lower ends mounted in bearings $i$ cast with or rigidly secured to a bar I arranged transversely of the machine. The lower ends of the rolls H' are mounted in bearings $i'$ cast with or secured to a bar I'. The bar I has the downward projecting web part $i^2$ and the inward turned flange $i^3$. The bar I' fits in the open space (see Fig. 13) above the flange $i^3$ and rests on the latter. Said bars I, I', are connected together by means of bolts or fastening devices $i^5$, extending through apertures $i^6$, $i^7$, formed in said bars I, I', respectively. As shown in Figs. 6 and 7 the apertures $i^6$, are elongated in the direction of the length of the bar I so that while the said bars I, I', are connected one can be adjusted transversely of the machine relative to the other in a manner and for a purpose that will be hereinafter explained. The bar I', is provided with a series of fixed bearings, $i'$, which project forward over the upper edge of the bar I at points between the bearings, $i$, on the last said bar. The boxes $i$, $i'$ are situated relatively to their carrying bars I, I', differently, but so that they lie together side by side on lines transverse of the machine when put in place. Each of the end collars $h'$ on the rolls H, H', is chambered out or made concave on the outer face so as to inclose the end of the bearing and prevent the entrance of dust, grit, etc.

To avoid complexity and number of parts I do not employ boxes with removable caps, bolts, etc., for the ends of the shafts, but the bearings are sockets with closed outer ends. Consequently the journals can be tightly inclosed and the rolls made small in diameter and have their axes close together.

The upper ends of the husking rolls are mounted as follows: K is a transverse bar rigidly fastened in the frame. It has recesses $k$ in its upper edge and in these are fitted the bearings or boxes $k'$ of the rollers H, each of the said bearings being a block with a shaft aperture and a flat face at $k^2$ adapted to extend over and rest upon the upper surface of the bar K', by which the bearings for the upper ends of the shafts of rollers H', are supported. The bearings or boxes $k'$ are also each provided with a downwardly projecting portion $k^5$, adapted to fit within the recess $k$ and with a flanged recess $k^3$ in the upper surface.

$k^4$ are the boxes for the upper ends of the shafts of rollers H', they being similar to those at $k'$ except that the flat surface $k^2$ is at the opposite end of the block. The flat surfaces $k^2$ of the boxes $k^4$ rest on the upper edge of the aforesaid bar K, said boxes each having a downward extending projection $k^6$ which fits in one of the notches $k^9$ formed in the bar K' by which said boxes are adjusted. This bar, K', is, preferably, supported by a flange $k^7$, on the bar K. In the upper surfaces of the boxes $k^4$, are formed recesses, $k^3$ similar to and adapted to aline with the corresponding recesses in the boxes, $k'$.

L is a bar placed above the bars K and K' and adapted to hold in place the bearings $k'$ and $k^4$, it fitting in the notches $k^3$ in the boxes or bearings $k'$, $k^4$.

To permit the shafts and rollers to be removed I combine with the bars I and I' means for moving them away from the rollers, these means being racks $j$ and pinions $j'$ on a shaft J mounted in the sides of the frame and having a hand wheel J' outside, together with a locking device at J². When the lower bearings, $i$, $i'$ are thus moved away from the husking rolls the latter are supported by the bars K, K', and when the locking bar L is detached any desired one of the husking rolls can be withdrawn from the machine.

The rolls H' of each pair of husking rolls are movable towards and from the rolls H for adjusting the distance between them; this adjustment being attained as follows: The bars I' and K' are both longitudinally movable and are respectively slotted at $i^8$ and $k^8$. M is a shaft mounted in the bearing bars I and K, and extending through the slots at $i^8$ and $k^8$, in the bars I' and K'. This shaft is secured to two hubs or disks $m$ and $m'$ loosely held in said bars I and K, the shaft passing eccentrically through the disks or hubs and being rigid therewith. The upper hub or disk $m'$ has a crank arm $m^2$ secured to or formed with it.

N is a link pivoted to the crank and engaging with a nut at $n$ and having a hand wheel N'.

When the wheel N' and the nut $n$ are turned the crank $m^2$ is rocked and with it the shaft M which moves bars I' and K' one way or the other to carry rolls H' toward or from the rolls H. Thus in an instant the rolls can be adjusted for operating on material having one set of conditions, or another as required, and as it is well known to those operating these machines such adjustments must be frequently made.

The washers $h^3$ have teeth $h^9$ which project slightly beyond the surface of the collars $h^2$, and the washers $h^4$ are smooth surfaced and correspondingly less in diameter. The washers $h^3$ and $h^4$ are placed alternately along the rollers H and H' and those on one roller alternate with those on the other. That is to say, a toothed washer $h^3$ is exactly opposite a smooth small washer $h^4$ and hence the husking teeth after passing through the working space pass into grooves in the opposite roller and permit the surfaces of the two rollers to be brought close together. By using collars of the sort shown and the toothed and the smooth washers, I can provide for readily building up rollers of any desired length and for repairing them at will with but little labor and an insignificant expense.

The rollers are driven by friction so as to avoid breakage or straining of the shafts, the friction being applied by a belt O. This is driven by a belt wheel O' mounted at one side of the machine and receiving power from gearing at $O^2$. The belt passes over a tightener at $O^3$ and thence over the pulleys $O^4$ of the rollers H and under the pulleys $O^5$ of the rollers H' thus imparting the requisite opposite movements to the members of the several pairs.

To insure the downward travel of the ears along the husking rolls I combine with them a positively acting propelling mechanism. P, P are endless belts supported on wheels $p$ $p'$. The wheels $p$ $p$ are mounted on a shaft P' which is carried in adjustable boxes $p'$ sliding in guides $p^2$, the boxes having screws $p^3$ and hand wheels $p^4$ for moving them up and down as desired. The lower wheel $p'$ of each belt P is mounted independently of the others, it being carried by one arm $q$ of a bell crank $q$ $q'$ pivoted to a bracket $q^2$. The arm $q'$ of the bell crank is fitted loosely to a rod $q^3$ which slides in eyes $q^4$ and has two springs $q^5$ held by thumb nuts $q^6$. The springs are adjusted to hold the bell crank and wheel $p'$ at the proper position, but they permit the wheel to rise in case it is required to allow some object to freely pass. The brackets $q^2$ are secured to parts of the same frame which carries the shaft P'. This frame is indicated by Q, Q' and is mounted in ways that permit it to slide in and out either to adjust its position or to remove it to allow access to the parts inside of it or below it.

Each belt P is provided at intervals with thin steel plates $p^5$ having bent or hooked ends $p^6$; and this is arranged so that these travel along one of the grooves between the rollers H and H'. As the plates $p^5$ move down the rolls their hooks $p^6$ engage with the ears and cause them to slowly advance and when they are used the inclination of the rollers can be such as to insure that the ears shall remain long enough on the rollers to have the husks removed and then be withdrawn.

The stalks which, as above described, are forced past the nippers or snapping rollers, F, F', are subjected to the shredder at R. This consists of a shaft $r$, a series of hubs $r'$, and a series of plates $r^2$ spaced apart by the hubs and held thereto by dowel pins $r^3$. Each plate $r^2$ is cut from a sheet of metal and formed to have a series of cutter arms $r^4$, these being alternately bent to the right and to the left so that each plane transverse to the axis of the shaft shall be occupied by at least one of the cutters. The stalks are cut into shreds as they pass this device and the resulting fibrous mass is received in a hopper S, which guides it down to the eye of a fan T. The latter communicates with a duct, T', terminating at the top in the mouth of a curved horizontally adjustable duct $T^2$. With the latter communicates a vertically adjustable duct $T^3$. When the machine is in operation the fan causes the fibrous mass received from the shredder to pass out through the ducts T', $T^2$, $T^3$, to the point of delivery which can be varied at will.

What I claim is:

1. In a corn husking machine, the combination with the ear husking devices, the snapping rolls, and the main feeding carrier, of the supplemental carrier arranged above and extending inwardly beyond the inner end of the main carrier, toward the snapping rolls, and means for adjustably supporting each end of said supplemental carrier whereby either end of said carrier may be adjusted about the axis of the supporting rollers at the opposite end, substantially as described.

2. In a corn husking machine, the combination with the means for removing the ears from the stalks and the flexible stalk feeding conveyer C, of means for holding the stalks against said carrier adapted to depress the upper flight of the carrier intermediate its ends to elevate the inner ends of the stalks relative to the said ear removing means as they are fed forward across the space between the inner end of the said feeding carrier and the said ear removing means, and means for directing the said elevated ends of the stalks to the said ear removing means.

3. In a corn husking machine, the combination with the means for removing the ears from the stalks and the flexible stalk feeding conveyer C, of means for holding the stalks against said carrier adapted to depress the upper flight of the carrier intermediate of its ends to elevate the inner ends of the stalks relative to the said ear removing means as they are projected forward across the space between the said feeding carrier and the said ear removing means and also adapted to direct the said elevated ends of the stalks to the said ear removing means.

4. In a corn husking machine, the combination of the snapping rolls, the endless, flexible, primary, carrier, C, for feeding stalks to said rolls, the supplemental carrier E, arranged above and projecting beyond the main or primary carrier, and means for adjusting the outer end of said supplemental carrier toward and from the main carrier, whereby the upper surface of the inner portion of the latter can be depressed and the inner ends of the stalks be elevated as they pass therefrom and directed to the snapping rolls, substantially as set forth.

5. In a corn husking machine, the combination of devices for removing ears from the stalks, a main carrier for feeding stalks towards said devices, and a supplemental carrier arranged above and extending inwardly beyond the main carrier, said supplemental carrier being adapted to be bodily adjusted about a pivotal support at one end, whereby the space between the main carrier and the ear removing devices can be uncovered when desired, substantially as set forth.

6. In a corn husking machine, the combination of devices for removing ears from the stalks, a main endless carrier for feeding stalks toward said ear removing devices, a supplemental carrier arranged above the main carrier and extending across the space between the inner end of said main carrier and said ear removing devices, and the husking devices, said supplemental carrier being supported at its outer end by a vertically adjustable and pivotally mounted shaft, substantially as and for the purpose specified.

7. In a corn husking machine, the herein described snapping rolls each having two convex parts of longer radius with curved ribbed surfaces and two concaved parts of shorter radius, and arranged to rotate so as to have the longer parts of one register with the shorter parts of the other, substantially as described.

8. In a corn husking machine, the herein described snapping rolls, each having two convex parts of longer radius, and two concave parts, intermediate of said convex parts, of shorter radius, said rolls being arranged to rotate to cause the convex surfaces of one to co-act with the concave surfaces of the other, substantially as set forth.

9. In a corn husking machine, the herein described snapping rolls, each having two oppositely arranged convex parts of longer radius, and having curved ribbed surfaces, and two concave, smooth surfaced, parts of shorter radius arranged opposite to each other and between said convex parts, whereby when the rolls are rotated the convex ribbed surfaces of one will successively register with the smooth concave surfaces of the other, substantially as set forth.

10. In a corn husking machine, the combination of a pair of husking rolls, an endless belt arranged above said rolls, and adapted to move the ears of corn longitudinally thereof, a bell crank having one arm supporting one end of said belt and a coiled spring arranged to act on the other arm of said bell crank, substantially as and for the purpose set forth.

11. In a corn husking machine, the combination of a pair of husking rolls, an endless belt arranged above said rolls, and adapted to move the ears of corn longitudinally thereof, a bell crank having one arm supporting one end of said belt and its other end engaged with a guide rod, and a spring fitted around said rod and contacting at one end with a projection on said rod and with a relatively stationary abutment at its other end, substantially as set forth.

12. In a corn husking machine, the combination with the snapping rolls and a carrier for feeding stalks thereto, of a series of husking rolls arranged below the snapping rolls, bearings for the ends of the shafts of said rolls, the bearings at one end of the rolls being movable lengthwise of the rolls, and means for positively moving the said bearings at one end of said rolls longitudinally of said shafts, substantially as set forth.

13. In a corn husking machine, the combination with the husking rolls, of a bar extending transversely of said rolls and supporting a series of bearings for the shafts of said rolls, a rack secured to said bar, a pinion meshing with said rack, and means for rotating said pinion, whereby said bar can be moved longitudinally of the rolls and the bearings separated from the shafts, substantially as set forth.

14. In a corn husking machine, the combination with the husking rolls, of the series of conveyer belts above the rolls and mounted on a frame common to said belts which is bodily adjustable longitudinally of and removable from the machine carrying in such adjustment or removal the said belts and their pulleys together, substantially as set forth.

15. In a corn husking machine, the combination with a pair of husking rolls, of a conveyer belt, above said rolls, and a supporting frame for said belt fitted to guides carried by the side walls of the machine, whereby said belt can be readily removed, bodily, from the machine, substantially as set forth.

16. In a corn husking machine, the combination with the husking rollers, H, H', arranged in pairs, of the bars I and K for the rollers H, and the bars I' and K', for the rollers H', and means for adjusting the members of each pair of supporting bars relatively to each other, substantially as described.

17. The combination with the husking rollers H, H', arranged in pairs, the bars which carry the rollers H, and the sliding bars which carry the rollers H', of the means for moving the sliding bars to vary the distance between the rolls H, H', and the single wheel for actuating said means, substantially as set forth.

18. In a corn husking machine, the combination of the husking rollers, H, H', arranged in pairs, the transverse bars I, I', having the bearings $i$, $i'$, for one end of the shafts of the husking rolls, the transverse bars K, K', adjacent to the other ends of said rolls, the detachable bearings, $k$, $k^4$, for the shafts of the husking rolls, connected with said bars K, K', and a locking bar, L, engaging with said detachable bearings, substantially as set forth.

19. In a corn husking machine, the combination of a pair of husking rolls, the bearings $i$, $i'$, for one end of the shafts of said rolls, the transverse bars K, K', adjacent to the other ends of said shafts, the bearings $k'$ detachably fitted in sockets in the bar K, the bearings $k^4$, detachably fitted in sockets in the bar K', a bar, L, connecting said bearings $k'$, $k^4$, and means for adjusting the bearings of one of said rolls laterally, substantially as set forth.

20. In a corn husking machine, the combination of a series of husking rollers H, a frame carrying the same, a series of rollers H' alternating with the rollers H, a frame common to and adapted to simultaneously move the rollers H' laterally, and means for actuating said frame.

21. In a corn husking machine, the combination of a series of husking rollers, bearings for said rollers, a frame carrying said bearings, a series of movable husking rollers alternating with the first mentioned rollers, bearings for said movable rollers, a movable frame engaging said bearings, means for adjusting said frame, and a movable bar confining the bearings on said frames.

22. In a corn husking machine, the combination with means for removing the ears from the stalks, and a flexible feeding carrier the upper limb of which is depressible to change the plane of feed, of means for depressing the upper limb of the carrier between its ends to elevate the inner ends of the stalks, said depressing means also acting to hold the stalks against said carrier and to direct their front ends to the said ear removing means after they are projected forward from the said carrier, substantially as set forth.

In testimony whereof, I affix my signature, in presence of two witnesses.

WILLIAM N. SPRINGER.

Witnesses:
  H. D. KELLENBACH,
  E. M. VOORHEES.